3,574,773
PRODUCTION OF ALK-3-EN-1-OLS
Herbert Mueller, Frankenthal, Pfalz, and Hermann Overwien and Horst Pommer, Ludwigshafen (Rhine), Germany, assignors to Badische Anilin- & Soda-Fabrik Aktiengesellschaft, Ludwigshafen (Rhine), Germany
No Drawing. Filed Feb. 15, 1968, Ser. No. 705,628
Claims priority, application Germany, Feb. 25, 1967, P 12 79 014.6, P 12 75 049.1-42, P 16 18 098.6; Dec. 30, 1967, P 16 43 729.9
Int. Cl. C07c 1/24, 33/02
U.S. Cl. 260—638
6 Claims

ABSTRACT OF THE DISCLOSURE

The production of alk-3-en-1-ols by reaction of olefins which contain at least one hydrogen atom on at least one of the carbon atoms adjacent to the carbon atoms of the double bond with an aldehyde at from 235° to 400° C.

---

The present invention relates to a new process for the production of alk-3-en-1-ols.

It is known from U.S. patent specification No. 2,308,192 that in the reaction of isobutene and formaldehyde in the presence of acid catalysts, 3-methylbut-3-en-1-ol is formed. The yields are however low and the separation of the m-dioxanes formed at the same time is difficult.

It is recommended in U.S. patent specification No. 2,335,027 that the reaction of isobutene with formaldehyde be carried out at elevated temperature without the use of an acid catalyst, the temperature range of from 170° to 180° C. being specified as the preferred range. Details of this reaction are given in the Journal of the American Chemical Society, volume 77 (1955), pages 4666 to 4668. However, in the temperature range from 170° to 200° C. so far investigated a maximum yield of only 31% of the theory of methylbutenol has been obtained.

It is the object of this invention to make accessible 3-methylbut-3-en-1-ol, which is important for organic syntheses, and alk-3-en-1-ols in general in high yields by a method which is universally applicable and uncomplicated.

We have now found that surprisingly alk-3-en-1-ols (I) are obtained in high yields and high purity by reacting an olefin (II) bearing at least one hydrogen atom on at least one of the carbon atoms adjacent to the carbon atoms of the double bond with an aldehyde (III) at from 235° to 400° C.

The reaction according to this invention may be represented by the following equation:

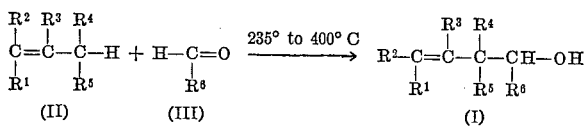

in which each of $R^1$, $R^2$, $R^3$, $R^4$, $R^5$ and $R^6$ denotes a hydrogen atom or a hydrocarbon radical.

Preferred radicals $R^1$ to $R^5$, apart from hydrogen atoms, are alkyl groups having one to eight carbon atoms. Cycloalkyl groups having five to eight ring members, aralkyl groups, such as the benzyl group, and aryl groups, such as the phenyl group or the tolyl group, are also suitable. The radicals $R^1$ to $R^5$ may also be attached to each other to form five- to twelve-membered rings, for example as in cyclohexene and in cyclododecene. Hydrogen atoms, methyl groups and ethyl groups are particularly important industrially as the radicals $R^1$ to $R^5$. Among the olefins (II) those having a total number of carbon atoms of three to twelve are preferred. If the radicals $R^3$, $R^4$ and $R^5$ also contain carbon atoms with one, two or three hydrogen atoms in α-position to the double bond, the reaction according to this invention may in some cases result in a mixture of different alkenols (I) if the radicals having the α-CH groups are not located symmetrically with respect to the double bond. However, since among several possible reactions one usually predominates over the others and proceeds more rapidly, clearly preponderant amounts of one alkenol (I) are usually obtained. For this reason it is also possible to start from technical mixtures of different olefins (II), for example of but-1-ene, but-2-ene and isobutene, the latter reacting more rapidly than the others. Otherwise mixtures of different alkenols (I) can be separated into their components by distillation without difficulty. The process may also be used for diolefins (II), that is to say if one of the radicals $R^1$ to $R^5$ also contains an olefinically unsaturated groups such as is the case for example with 1,4-pentadiene, 1,3-pentadiene or cyclopentadiene. Since some of the olefins are formed from the corresponding alcohols by dehydration under the reaction conditions, it may be advantageous to use alcohols for the reaction. This applies particularly to tertiary alcohols, for example tertiary-butyl alcohol.

Formaldehyde is a particularly suitable aldehyde (III); other suitable aldehydes are alkylaldehydes having two to ten carbon atoms, such as acetaldehyde, propionaldehyde and butyraldehyde. Cyclohexylaldehyde is suitable as a cycloaliphatic aldehyde, phenylacetaldehyde as an araliphatic aldehyde and benzaldehyde as an aromatic aldehyde.

In this case, too, it is not necessary to start from the free aldehydes, but hydrates, acetals such as dimethylacetal and diethylacetal, and oligomers and polymers of aldehydes having the general formula: $(R^6\text{—CHO})_3$ to $(R^6\text{—CHO})_{100}$ may be used.

Examples of such oligomers and polymers include trioxane, paraformaldehyde, paraldehyde and their hydrates. The polymers may as usual contain ester groupings or ether groupings at the ends of the chains. It is particularly advantageous and economical in the case of formaldehyde to start from aqueous formaldehyde solutions for it has been found, surprisingly, that water does not disturb the reaction although addition of water to the olefin (II) would have been expected.

The compounds (II) and (III) react with each other stoichiometrically but it is often advantageous to use one of the components (usually the cheaper olefin) in an excess of up to about 50 moles, preferably 10 moles, in order to accelerate the reaction.

Although the use of a catalyst is in principle not necessary, it is advisable to carry out the reaction in the presence of a base.

Examples of suitable bases are hydroxides, carbonates and bicarbonates of the alkali metals and alkaline earth metals, and salts of acids which are weaker than formic acid. It is particularly advantageous to use ammonia or organic amines, such as ethylamine, trimethylamine, aniline, pyridine or piperidine. Substances exhibiting a buffer action, such as hexamethylenetetramine, are particularly suitable.

The bases are used only in small amounts, generally from 0.001 to 10%, particularly from 0.01 to 1%, by weight with reference to the total amount of reaction mixture. The optimum amount depends on the reaction conditions and may easily be determined by experiment. The amount should preferably be such that during the reaction the acid formed by disproportionation of the aldehyde is also intercepted. It is advantageous to use such an amount of base that a sample of the reaction mixture, after cooling and if necessary after the addition of an equal amount by weight of water, has a pH value of from 6.5 to 10, particularly from 7 to 9.

It is advantageous to use weak bases and, in order to avoid secondary reactions which may take place in a strongly alkaline range, to ensure that the starting mixture of the reactants, after the base has been added, has a pH value of from 7 to 11, advantageously from 7 to 10, particularly from 7.5 to 9. To determine this value, the starting mixture (if anhydrous starting materials have been used) is diluted with an equal amount by weight of water.

The reaction is carried out at temperatures of from 235° to 400° C., particularly from 240° to 350° C., and at superatmospheric pressure, for example at the vapor pressure of the reactants at the reaction temperature, for example up to 1000 atmospheres gauge, particularly from 50 to 500 atmospheres gauge.

It has proved to be particularly advantageous to use a pressure which is equal to or higher than the vapor pressure of the reactants at the reaction temperature and to work under liquid pressure while avoiding a gas phase. This is best achieved, by continuous supply of the starting materials continuously and continuous withdrawal of reaction products from the top of the reactor during the reaction, thus avoiding the formation of a cushion of inert gas. Thus, it will be apparent that the reaction can be carried out substantially in the liquid phase.

The residence time may vary within wide limits and is closely dependent on the reaction temperature, the pressure and the molar ratio used. Residence times of from 5 to 1000 minutes, particularly from 10 to 120 minutes, are preferred. The reaction may be carried out without solvents, but it is also possible to use inert solvents or diluents, for example saturated aliphatic or aromatic hydrocarbons, alcohols, ethers or water. Examples of suitable solvents are hexane, octane, benzene, diethyl ether, dioxane, methanol, propanol, tertiary-butanol and particularly the reaction components themselves. Mixtures of solvents may also be used. The solvent or diluent is used in general in an amount 0.1 to 10 times the weight of the reactants.

Sometimes it is advantageous to carry out the reaction in the presence of a substance having a large surface area. Examples of suitable substances are aluminum oxide, silica gel, molecular sieves or active carbon.

The reaction may be carried out batchwise or continuously.

The reaction mixture may be worked up by conventional methods of physical or chemical separation. It is usually distilled, unreacted material being recovered and if desired used again in the reaction. It has been found to be advantageous to make the reaction mixture weakly alkaline by adding caustic soda solution prior to processing in order to prevent splitting of the alkenol to the corresponding diolefin.

The alk-3-en-1-ols (I) are valuable intermediates for organic syntheses. They may readily be converted for example into the corresponding diolefins by elimination of water; they may also be hydrogenated and then converted into the corresponding alk-1-enes by elimination of water.

The invention is further illustrated by the following examples.

EXAMPLE 1

A mixture of 120 g. of aqueous formaldehyde solution (37% by weight) and 365 g. of propylene is heated for one hour at 310° C. in an autoclave having a capacity of 1 liter. The reaction product obtained is purified by distillation. 70 g. (equal to 65%) of but-3-en-1-ol is obtained.

EXAMPLE 2

An autoclave having a capacity of 1 liter is charged continuously in the course of six hours at 275° C. and 300 atmospheres gauge with a mixture of 1550 g. of 37% by weight aqueous formaldehyde solution, 9000 g. of isobutene and 15 g. of aqueous ammonia solution (25% by weight).

Conventional working up of the reaction product gives 3-methyl-but-3-en-1 ol in a yield of 87% by weight with reference to isobutene reacted. The amount of reacted isobutene is 1000 g.

An equally good result is achieved when 16 g. of hexamethylenetetramine is used instead of 15 g. of ammonia solution.

EXAMPLE 3

An autoclave having a capacity of 1 liter is charged per hour with a mixture of 44 g. of trioxane, 180 g. of tetrahydrofuran and 1500 g. of isobutene, care being taken that no gas phase forms.

Conventional working up by distillation gives 3-methylbut-3-en-1-ol in a 4.5% yield per hour. The loss of isobutene is negligible; the unreacted isobutene is recycled to the reaction.

We claim:
1. A process for the production of an alk-3-en-1-ol of the formula

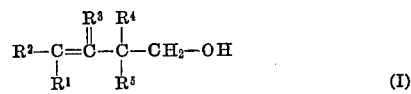

(I)

in which $R^1$, $R^2$, $R^3$, $R^4$ and $R^5$ each denotes a member selected from the class consisting of hydrogen and alkyl of 1 to 8 carbon atoms, which process comprises reacting an olefin of the formula

(II)

in which $R^1$, $R^2$, $R^3$, $R^4$ and $R^5$ have the meaning set forth above, substantially in the liquid phase with a compound selected from the class consisting of formaldehyde, its oligomers and polymers at a temperature of 235° C. to 400° C. and at a pressure of 50 to 500 atmospheres gauge in the presence of 0.001 to 10% by weight, with reference to the total weight of the reaction mixture, of a base, in order that the starting mixture of the reactants, after the base has been added, has a pH value of from 7 to 11.

2. A process as claimed in claim 1 wherein the olefin reactant contains 3 to 12 carbon atoms.

3. A process as claimed in claim 1 wherein the reaction is carried out under liquid pressure while completely avoiding a gas phase.

4. A process as claimed in claim 1 wherein the base is ammonia.

5. A process as claimed in claim 1 wherein the reaction is carried out at a temperature of from 240° C. to 350° C.

6. A process as claimed in claim 1 wherein the olefin reactant is isobutene.

References Cited

UNITED STATES PATENTS

| | | | |
|---|---|---|---|
| 2,335,027 | 11/1943 | Rotter | 260—638 |
| 2,624,766 | 1/1953 | Butler | 260—638 |
| 3,414,588 | 12/1969 | Jones | 260—638 |

OTHER REFERENCES

Brace, "J. Am. Chem. Soc.," vol. 77, (1955), pages 4666 to 4668, QUIA51.

BERNARD HELFIN, Primary Examiner

J. E. EVANS, Assistant Examiner

U.S. Cl. X.R.

260—617, 618, 642, 681, 682

PO-1050
(5/69)

UNITED STATES PATENT OFFICE
CERTIFICATE OF CORRECTION

Patent No. 3,574,773          Dated April 13, 1971

Inventor(s) Herbert Mueller et al

It is certified that error appears in the above-identified patent and that said Letters Patent are hereby corrected as shown below:

Column 4, line 34, Claim 1, that portion of the formula reading
"$\underset{\underset{C}{\|}}{R^3}$" should read -- $\underset{\underset{C}{|}}{R^3}$ -- .

Column 4, line 63, in the references, "Rotter" should read -- Ritter --.

Signed and sealed this 3rd day of August 1971.

(SEAL)
Attest:

EDWARD M. FLETCHER, JR.
Attesting Officer

WILLIAM E. SCHUYLER, JR.
Commissioner of Patents